United States Patent
Marks et al.

(10) Patent No.: US 9,260,560 B2
(45) Date of Patent: Feb. 16, 2016

(54) EPOXY-FUNCTIONAL RESIN COMPOSITIONS

(75) Inventors: Maurice J. Marks, Lake Jackson, TX (US); Gyongyi Gulyas, Lake Jackson, TX (US)

(73) Assignee: Blue Cube IP LLC, Midland, MI (US)

( * ) Notice: Subject to any disclaimer, the term of this patent is extended or adjusted under 35 U.S.C. 154(b) by 55 days.

(21) Appl. No.: 14/240,987

(22) PCT Filed: Sep. 5, 2012

(86) PCT No.: PCT/US2012/053715
§ 371 (c)(1),
(2), (4) Date: Feb. 25, 2014

(87) PCT Pub. No.: WO2013/043363
PCT Pub. Date: Mar. 28, 2013

(65) Prior Publication Data
US 2014/0213755 A1     Jul. 31, 2014

Related U.S. Application Data

(60) Provisional application No. 61/537,080, filed on Sep. 21, 2011.

(51) Int. Cl.
*C08G 59/24* (2006.01)
*C08L 63/00* (2006.01)
*C08G 59/18* (2006.01)

(52) U.S. Cl.
CPC ............ *C08G 59/245* (2013.01); *C08G 59/184* (2013.01); *C08L 63/00* (2013.01)

(58) Field of Classification Search
None
See application file for complete search history.

(56) References Cited

U.S. PATENT DOCUMENTS

| | | | |
|---|---|---|---|
| 2,912,389 A | 11/1959 | Phillips et al. | |
| 2,924,580 A * | 2/1960 | Phillips et al. | 528/408 |
| 2,982,752 A * | 5/1961 | Phillips et al. | 525/526 |
| 2011/0122590 A1* | 5/2011 | Wilson et al. | 361/760 |
| 2013/0059945 A1* | 3/2013 | Marks et al. | 523/456 |

* cited by examiner

*Primary Examiner* — Robert Sellers

(57) ABSTRACT

An epoxy-functional resin composition including the reaction product of (a) a stoichiometric excess of at least one divinylarene dioxide, and (b) at least one of: a primary (1°) monoamine, a bis-secondary (2°) amine lacking nitrogen atoms, or mixtures thereof; a curable composition including (i) the epoxy-functional resin composition, and (ii) at least one curing agent; and a cured thermoset resin prepared from the curable composition.

13 Claims, No Drawings

EPOXY-FUNCTIONAL RESIN COMPOSITIONS

FIELD

The present invention is related to epoxy-functional resin compositions including a reaction product of a divinylarene dioxide and an amine compound.

BACKGROUND

Epoxy-functional derivatives of epoxy resins are of interest in the industry as these derivatives can be useful to improve the properties of the curable epoxy resin formulations made from such epoxy-functional derivatives such as reduced volatility and reaction exotherm; and to improve the properties of the thermosets derived from these curable epoxy resin formulations such as increased flexibility and fracture toughness.

Epoxy-functional resins comprising the reaction products of an excess of bisphenol A diglycidyl ether and a primary (1°) monoamine (such as n-butylamine) are known in the prior art. However, these known epoxy-functional resins have a relatively poor balance of properties, i.e., one or more of the resins' properties such as heat resistance and melt viscosity may be inadequate for use in some applications.

Various polymers of divinylbenzene dioxide (DVBDO) including epoxy-functional resins comprising the reaction product of excess DVBDO and a polyamine such as diethylenetriamine are also disclosed in the prior art. For instance, Examples 24-28 of U.S. Pat. No. 2,912,389 disclose epoxy-functional resins. However, the epoxy-functional resins disclosed in U.S. Pat. No. 2,912,389 have a very high equivalent ratio of epoxide/amine groups (e.g., r=10) and the resulting epoxy-functional resins gel upon heating to greater than or equal to ($\geq$) 120° C.

SUMMARY

Epoxy-functional derivatives of divinylarene dioxides are of interest in the industry as these derivatives can be useful to reduce the volatility and reaction exotherm of curable divinylarene dioxide formulations and to increase the flexibility and fracture toughness of thermosets derived from these divinylarene dioxide formulations. The aforementioned improvements may be possible as a result of the increased molecular weight of the divinylarene dioxide derivative while maintaining the derivative's epoxy-functionality for subsequent reaction with epoxy curing agents. Epoxy-functional resins comprising the reaction product of a stoichiometric excess of a divinylarene dioxide and either of a primary (1°) monoamine, or a bis-secondary (2°) amine lacking β nitrogen atoms, or mixtures thereof are novel compositions which offer the above improvements.

One embodiment of the present invention is directed to an epoxy-functional resin composition comprising the reaction product of (a) a stoichiometric excess of at least one divinylarene dioxide, and (b) at least one of (1) a primary (1°) monoamine, (2) a bis-secondary (2°) amine lacking β nitrogen atoms, or (3) mixtures thereof.

The epoxy-functional resin compositions of the present invention do not utilize a polyamine and the resulting epoxy resin reaction product does not gel upon heating to elevated temperatures.

Another embodiment of the present invention is directed to a curable epoxy resin composition including (i) an epoxy-functional resin composition described above, (ii) at least one curing agent, and (iii) any other optional compounds as desired.

Still another embodiment is directed to a cured material derived from the above curable formulation.

DETAILED DESCRIPTION

One broad aspect of the present invention includes an epoxy-functional resin comprising the reaction product of (a) a stoichiometric excess of a divinylarene dioxide; and (b) (1) at least one 1° monoamine, (2) at least one bis-2° amine lacking β nitrogen atoms, or (3) mixtures thereof.

In one embodiment, the divinylarene dioxide, component (a), useful in the present invention may comprise, for example, any substituted or unsubstituted arene nucleus bearing one or more vinyl groups in any ring position. For example, the arene portion of the divinylarene dioxide may consist of benzene, substituted benzenes, (substituted) ring-annulated benzenes or homologously bonded (substituted) benzenes, or mixtures thereof. The divinylbenzene portion of the divinylarene dioxide may be ortho, meta, or para isomers or any mixture thereof. Additional substituents may consist of $H_2O_2$-resistant groups including saturated alkyl, aryl, halogen, nitro, isocyanate, or RO— (where R may be a saturated alkyl or aryl). Ring-annulated benzenes may consist of naphthlalene, tetrahydronaphthalene, and the like. Homologously bonded (substituted) benzenes may consist of biphenyl, diphenylether, and the like.

The divinylarene dioxide used for preparing the formulations of the present invention may be illustrated generally by general chemical Structures I-IV as follows:

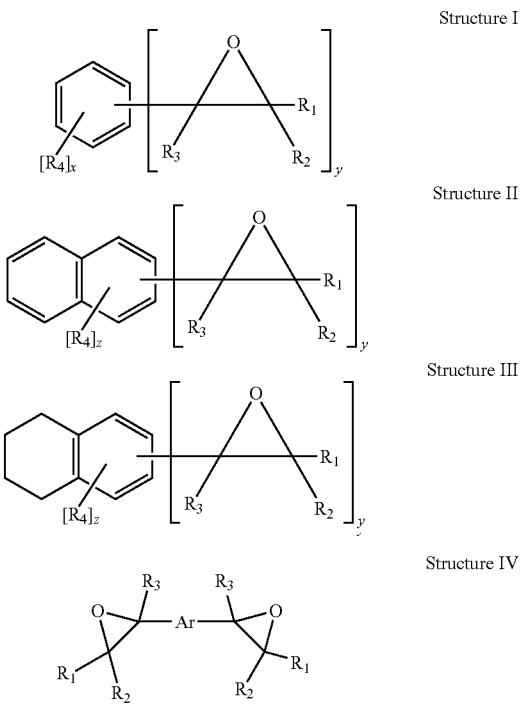

In the above Structures I, II, III, and IV of the divinylarene dioxide comonomer of the present invention, each $R_1$, $R_2$, $R_3$ and $R_4$ individually may be hydrogen, an alkyl, cycloalkyl, an aryl or an aralkyl group; or a $H_2O_2$-resistant group including for example a halogen, a nitro, an isocyanate, or an RO group, wherein R may be an alkyl, aryl or aralkyl; x may be an integer of 0 to 4; y may be an integer greater than or equal to 2; x+y may be an integer less than or equal to 6; z may be an integer of 0 to 6; and z+y may be an integer less than or equal to 8; and Ar is an arene fragment including for example, 1,3-phenylene group. In addition, R4 can be a reactive group(s) including epoxide, isocyanate, or any reactive group and Z can be an integer from 0 to 6 depending on the substitution pattern.

In one embodiment, the divinylarene dioxide used in the present invention may be produced, for example, by the process described in U.S. patent application Ser. No. 13/133,510 filed Nov.23, 2009, U.S. Pat. No. 8,497,387, by Marks et al., incorporated herein by reference. The divinylarene dioxide compositions that are useful in the present invention are also disclosed in, for example, U.S. Pat. No. 2,924,580, incorporated herein by reference.

In another embodiment, the divinylarene dioxide useful in the present invention may comprise, for example, divinylbenzene dioxide, divinylnaphthalene dioxide, divinylbiphenyl dioxide, divinyldiphenylether dioxide, and mixtures thereof.

In one preferred embodiment of the present invention, the divinylarene dioxide used in the epoxy resin formulation may be for example divinylbenzene dioxide (DVBDO). In another embodiment, the divinylarene dioxide component that is useful in the present invention includes, for example, a DVBDO as illustrated by the following chemical formula of Structure V:

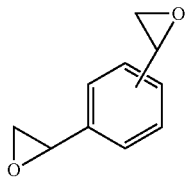

Structure V

The chemical formula of the above DVBDO compound may be as follows: $C_{10}H_{10}O_2$; the molecular weight of the DVBDO is about 162.2; and the elemental analysis of the DVBDO is about: C, 74.06; H, 6.21; and O, 19.73 with an epoxide equivalent weight of about 81 g/mol.

Divinylarene dioxides, particularly those derived from divinylbenzene such as for example DVBDO, are class of diepoxides which have a relatively low liquid viscosity but a higher rigidity and crosslink density than conventional epoxy resins.

Structure VI below illustrates an embodiment of a preferred chemical structure of the DVBDO useful in the present invention:

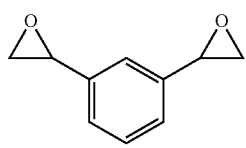

Structure VI

Structure VII below illustrates another embodiment of a preferred chemical structure of the DVBDO useful in the present invention:

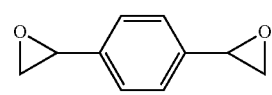

Structure VII

When DVBDO is prepared by the processes known in the art, it is possible to obtain one of three possible isomers: ortho, meta, and para. Accordingly, the present invention includes a DVBDO illustrated by any one of the above Structures individually or as a mixture thereof. Structures VI and VII above show the meta (1,3-DVBDO) isomer and the para (1,4-DVBDO) isomer of DVBDO, respectively. The ortho isomer is rare; and usually DVBDO is mostly produced generally in a range of from about 9:1 to about 1:9 ratio of meta (Structure VI) to para (Structure VII) isomers. The present invention preferably includes as one embodiment a range of from about 6:1 to about 1:6 ratio of Structure VI to Structure VII, and in other embodiments the ratio of Structure VI to Structure VII may be from about 4:1 to about 1:4 or from about 2:1 to about 1:2.

In yet another embodiment of the present invention, the divinylarene dioxide may contain quantities [such as for example less than (<) about 20 weight percent (wt %)] of substituted arenes and/or arene oxides. The amount and structure of the substituted arenes and arene oxides depend on the process used in the preparation of the divinylarene precursor to the divinylarene dioxide. For example, divinylbenzene prepared by the dehydrogenation of diethylbenzene (DEB) may contain quantities of ethylvinylbenzene (EVB) and DEB. Upon reaction with hydrogen peroxide, EVB produces ethylvinylbenzene oxide while DEB remains unchanged. The presence of these compounds can increase the epoxide equivalent weight of the divinylarene dioxide to a value greater than that of the pure compound.

In one embodiment, the divinylarene dioxide, for example DVBDO, useful in the present invention comprises a low viscosity liquid epoxy resin. The viscosity of the divinylarene dioxide used in the present invention ranges generally from about 0.001 Pa s to about 0.1 Pa s in one embodiment, from about 0.01 Pa s to about 0.05 Pa s in another embodiment, and from about 0.01 Pa s to about 0.025 Pa s in still another embodiment, at 25° C.

One advantageous property of the divinylarene dioxide useful in the present invention is its rigidity. The rigidity property of the divinylarene dioxide is measured by a calculated number of rotational degrees of freedom of the dioxide excluding side chains using the method of Bicerano described in *Prediction of Polymer Properties*, Dekker, New York, 1993. The rigidity of the divinylarene dioxide used in the present invention may range generally from about 6 to about 10 rotational degrees of freedom in one embodiment, from about 6 to about 9 rotational degrees of freedom in another embodiment, and from about 6 to about 8 rotational degrees of freedom in still another embodiment.

The concentration of the divinylarene oxide used in the present invention as the epoxy resin component (a) of the reaction product composition will depend on the other ingredients used to make the reaction product. In general, the concentration of the divinylarene oxide useful for making the reaction product may range generally from about 0.5 wt % to about 99 wt % in one embodiment, from about 1 wt % to about 99 wt % in another embodiment, from about 2 wt % to about 98 wt % in still another embodiment, and from about 5 wt % to about 95 wt % in yet another embodiment, depending on the fractions of the other ingredients in the reaction product composition.

A 1° monoamine, component (b1), useful in the present invention, may comprise any conventional 1° monoamine known in the art including one 1° monoamine compound or a mixture of 1° monoamine compounds, either aliphatic or aromatic. In general, the aliphatic 1° monoamine useful in the composition, may be selected, for example, from 1° monoamines including, but are not limited to 2-methoxyethylamine, n-butylamine, isopropyl amine, N,N-dimethylethylenediamine, N,N'-dimethylethylenediamine, Jeffamine M-600 polyether amine, 1-methoxy-2-aminopropane, 1-(2-methoxy-1-methylethoxy)-2-amino-propane, 1-propoxy-2-aminopropane, 1-butoxy-2-aminopropane, 2-butoxy-1-aminoethane, 2-(2-methoxyethoxy)-1-aminoethane, and cyclohexylamine. In general, the aromatic 1° monoamine useful in the composition, may be selected, for example, from 1° monoamines including, but are not limited to aniline, chloroaniline, toluidine, and naphthylamine.

For example, the 1° monoamine useful in preparing the epoxy-functional resin of the present invention may comprise an organic amine have a structure R—NH$_2$, where R is any organic group bearing any form of substituent except that which reacts with an epoxide group without a catalyst at temperatures <100° C. such as —NH—, —NH$_2$, —SH and phenolic OH. The R group can be for example alkyl, cycloalkyl, alkenyl, aryl, or aralkyl, and may contain from 1 to about 200 carbon atoms. The R group can bear substituents such as for example alcohols, ethers, esters, halogens, thioethers, tertiary amino, cyano or amides.

A bis-2° amine lacking β nitrogen atoms, component (b2), useful for the composition of the present invention, may comprise any conventional bis-2° amine which does not contain two or more nitrogen atoms separated by two carbon atoms (β nitrogen atoms) known in the art including one bis-2° amine compound or a mixture of bis-2° monoamine compounds, either aliphatic or aromatic. In general, the aliphatic bis-2° amine useful in the composition, may be selected, for example, from bis-2° amines including, but are not limited to N,N'-bis(2-propyl)polyoxypropylenediamine with different number average molecular weight such as 230 (Jeffamine SD-231), 400 (Jeffamine SD-401, ST-404) and 2000 (Jeffamine SD-2001); N,N-bis-p-(sec-butylamino) diphenylmethane (Unilink 4200), N,N-bis-p-(sec-butylamino)benzene (Unilink 4100) N,N-bis-p-(sec-butylamino) cyclohexylmethane (Clearlink 1000), N,N-bis(sec-propylamino)isophorone diamine (IPDA) (Jefflink 754 JK754), and N,N'-dimethylphenylenediamine.

For example, the bis-2° amine useful in preparing the epoxy-functional resin of the present invention may comprise an organic amine have a structure R—NH—R'—NH—R", where R, R', and R" are any organic groups bearing any form of substituent except that which reacts with an epoxide group without a catalyst at temperatures <100° C., such as —NH—, —NH$_2$, —SH, and phenolic OH and such that the bis-2° amine lacks β nitrogen atoms. The R, R', R" groups each separately and independently can be alkyl, cycloalkyl, alkenyl, aryl, or aralkyl, and may contain from 1 to about 200 carbon atoms. The R, R', R" groups each separately and independently can bear substituents such as for example alcohols, ethers, esters, halogens, thioethers, cyano, tertiary amino or amides.

The concentration of the 1° monoamine, bis-2° amine lacking β nitrogen atoms, or mixtures thereof used in the present invention is such that the equivalent ratio of epoxide/amine-hydrogen (NH) groups, "r", in the composition is a value of r ranging generally from about 1.01 to about 100 in one embodiment; from about 1.01 to about 20 in another embodiment; and from about 1.01 to about 2 in still another embodiment.

Optional elements in the epoxy-functional reaction product may include other epoxy resins ((i.e. aromatic and aliphatic glycidyl ethers). For example, the optional epoxy resin which is different from the divinylarene dioxide, and which may be used in the reaction product of the present invention, may be any epoxy resin component or combination of two or more epoxy resins known in the art such as epoxy resins described in Lee, H. and Neville, K., *Handbook of Epoxy Resins*, McGraw-Hill Book Company, New York, 1967, Chapter 2, pages 2-1 to 2-27, incorporated herein by reference. Particularly suitable other epoxy resins known in the art include for example epoxy resins based on reaction products of polyfunctional alcohols, phenols, cycloaliphatic carboxylic acids, aromatic amines, or aminophenols with epichlorohydrin. A few non-limiting embodiments include, for example, bisphenol A diglycidyl ether, bisphenol F diglycidyl ether, resorcinol diglycidyl ether, and triglycidyl ethers of para-aminophenols. Other suitable epoxy resins known in the art include for example reaction products of epichlorohydrin with o-cresol novolacs, hydrocarbon novolacs, and, phenol novolacs. The epoxy resin may also be selected from commercially available products such as for example, D.E.R. 331®, D.E.R.332, D.E.R. 354, D.E.R. 580, D.E.N. 425, D.E.N. 431, D.E.N. 438, D.E.R. 736, or D.E.R. 732 epoxy resins available from The Dow Chemical Company.

Generally, the amount of other epoxy resin, when used in the present invention, may be for example, from 0 wt % to about 99 wt % in one embodiment, from about 0.1 wt % to about 99 wt % in another embodiment; from about 1 wt % to about 99 wt % in still another embodiment; and from about 1 wt % to about 50 wt % in yet another embodiment.

The optional reaction catalyst useful in the present invention may be selected from any of the compounds known in the art to catalyze epoxide-amine coupling reactions, including tertiary amines, sulfonates, cyclic carbonates, various hydrogen donor compounds, and mixtures thereof. The tertiary amine reaction catalyst comprise compounds having a structure R(R')(R")N, where R, R', and R" are each bonded to nitrogen and represent any organic group. For example, the tertiary amine reaction catalysts of the present invention may include trioctylamine and benzyldimethylamine. The sulfonate reaction catalysts comprise compounds having a structure R—SO$_2$—R', where R and R' are any organic group. For example, the sulfonate reaction catalyst of the present invention may include an aromatic sulfonate such as methyl-p-toluenesulfonate (MPTS) or an aliphatic sulfonate such as methyl methanesulfonate. The cyclic carbonate reaction catalyst of the present invention comprises any organic compound bearing a cyclic carbonate group. For example, cyclic carbonate reaction catalyst of the present invention may include ethylene carbonate, propylene carbonate, butylene carbonate, and phenyl ethylene carbonate. The hydrogen donor compound reaction catalyst of the present invention may comprise any sulfonic acid, carboxylic acid, phenol, alcohol, or thiol. For example the hydrogen donor compound of the present invention may include any aliphatic or aromatic sulfonic acid such as methanesulfonic acid or benzenesulfonic acid, any aliphatic or aromatic carboxylic acid such as acetic acid or benzoic acid, any phenol such as phenol, cresol, nonylphenol, pentadecylphenol, bisphenol A, or bisphenol F, any alcohol such as butanol, propylene glycol, or benzyl alcohol, any thiol such as octyl thiol or dodecylthiophenol, or any hydrogen donor compound having a combination or multiplicity of the above functional groups such as salicylic acid, triethanolamine, or tris(dimethylaminomethyl)phenol.

Generally, the amount of reaction catalyst, when used in the present invention, may be for example, from 0 wt % to about 20 wt % in one embodiment, from about 0.01 wt % to about 15 wt % in another embodiment; from about 0.1 wt % to about 10 wt % in still another embodiment; and from about 0.05 wt % to about 5 wt % in yet another embodiment.

The process for preparing an epoxy-functional resin composition of matter includes the first step of preparing a mixture of a stoichiometric excess of a divinylarene dioxide and at least one of either of a 1° monoamine, a bis-2° amine lacking β nitrogen atoms, or mixtures thereof; and then the second step of allowing at least a portion of the epoxide and amine groups in the mixture to react, with application of heat if required. Mixtures of any number divinylarene dioxides and/or mixtures of any number of at least one of either of a 1° monoamine or a bis-2° amine lacking β nitrogen atoms may be employed.

For example, in one embodiment, the epoxy-functional resin composition of the present invention may comprise reacting (a) at least one divinylarene dioxide; (b) at least one of either of a 1° monoamine, a bis-2° amine lacking β nitrogen atoms, or mixtures thereof; and (c) optionally, other ingredients as needed. For example, the preparation of the epoxy-functional reaction product of the present invention is achieved by blending the divinylarene dioxide, the at least one of either of a 1° monoamine, a bis-2° amine lacking β nitrogen atoms, or mixtures thereof, and optionally any other desirable additive or additives in a reaction vessel and heating the reaction mixture at a reaction temperature range from about 25° C. to about 250° C. in one embodiment, from about 50° C. to about 225° C. in another embodiment, and from about 100° C. to about 200° C. in still another embodiment. Any of the above-mentioned optional assorted formulation additives, for example an additional epoxy resin different from the divinylarene dioxide, may be added to the reactive mixture during the reaction of the mixture or prior to reacting the mixture to form the epoxy-functional reaction product composition.

The compositions of the present invention have higher heat resistance (as determined by glass transition temperature, $T_g$), lower melt viscosity ($\eta^*$), and lower change in melt viscosity (% $\Delta\eta^*$) than epoxy-functional resins of the prior art. In one embodiment, the epoxy-functional resins of the present invention have a $T_g$ of generally about 10% greater than analogous compositions of the prior art; about 15% greater than analogous compositions of the prior art in another embodiment; and about 20% greater than analogous compositions of the prior art in still another embodiment.

In one embodiment, the epoxy-functional resins of the present invention have a $\eta^*$ of generally about 10% lower than analogous compositions of the prior art; about 15% lower than analogous compositions of the prior art in another embodiment; and about 20% lower than analogous compositions of the prior art in still another embodiment.

In one embodiment, the epoxy-functional resins of the present invention have a % $\Delta\eta^*$ of generally about 10% lower than analogous compositions of the prior art; about 15% lower than analogous compositions of the prior art in another embodiment; and about 20% lower than analogous compositions of the prior art in still another embodiment.

Another broad aspect of the present invention includes a curable formulation comprising (i) an epoxy-functional reaction product of (a) a stoichiometric excess of a divinylarene dioxide, and (b) at least one of either of a 1° monoamine, a bis-2° amine lacking β nitrogen atoms, or mixtures thereof; (ii) an epoxy curing agent; and (iii) optionally a curing catalyst.

In preparing the curable resin formulation of the present invention, the epoxy-functional reaction product described above may be used as component (i).

The curing agent useful in preparing the curable composition of the present invention may comprise any conventional curing agent known in the art. The curing agent, (also referred to as a hardener or cross-linking agent) useful in the curable composition, may be selected, for example, from those curing agents well known in the art including, but are not limited to, anhydrides, carboxylic acids, amine compounds, phenolic compounds, polyols, or mixtures thereof. In preferred embodiment, the curing agent may include a polyamine, a polyphenol, an anhydride, a polymercaptans, or mixtures thereof.

Examples of curing agents useful in the present invention may include any of the co-reactive or catalytic curing materials known to be useful for curing epoxy resin based compositions. Such co-reactive curing agents include, for example, polyamine, polyamide, polyaminoamide, dicyandiamide, polyphenol, polymeric thiol, polycarboxylic acid and anhydride, and any combination thereof or the like. Suitable catalytic curing agents include tertiary amine, quaternary ammonium halide, Lewis acids such as boron trifluoride, and any combination thereof or the like. Other specific examples of co-reactive curing agent include phenol novolacs, bisphenol-A novolacs, phenol novolac of dicyclopentadiene, cresol novolac, diaminodiphenylsulfone, styrene-maleic acid anhydride (SMA) copolymers; and any combination thereof. Among the conventional co-reactive epoxy curing agents, amines and amino or amido containing resins and phenolics are preferred.

Dicyandiamide may be one preferred embodiment of the curing agent useful in the present invention. Dicyandiamide has the advantage of providing delayed curing since dicyandiamide requires relatively high temperatures for activating its curing properties; and thus, dicyandiamide can be added to an epoxy resin and stored at room temperature (about 25° C.).

In one embodiment, the curable resin formulations of the present invention can be cured using for example, anhydrides and mixtures of anhydrides with other curing agents. The anhydride curing agent is preferably a tertiary amine, an imidazole, a boron trihalide-amine complex, or an ammonium, phosphonium, stannic or chromium salt.

Generally, the amount of curing agent used in the present invention, may be for example, from about 1 wt % to about 99 wt % in one embodiment, from about 5 wt % to about 95 wt % in another embodiment; from about 10 wt % to about 90 wt % in still another embodiment. Above and below the aforementioned ranges, there is no significant effect or there may be some deterioration of the resin properties.

The optional elements that may be added to the curable composition of the present invention may include, for example, other epoxy resins (i.e. aromatic and aliphatic glycidyl ethers, cycloaliphatic epoxy resins), other curing agents, cure catalysts, fillers, reactive diluents, pigments, flexibilizing agents, toughening agents, flow modifiers, processing aides, adhesion promoters, and mixtures thereof.

One of the optional elements that may be added to the curable composition of the present invention may include, for example, an epoxy resin which is different from the epoxy-functional reaction product. The other epoxy resin may be any epoxy resin component or combination of two or more epoxy resins known in the art such as the epoxy resins described above (i.e. aromatic and aliphatic glycidyl ethers).

Generally, the amount of the other epoxy resin, when used in the present invention, may be for example, from 0 wt % to about 99 wt % in one embodiment, from about 0.1 wt % to about 99 wt % in another embodiment; from about 1 wt % to about 99 wt % in still another embodiment; and from about 1 wt % to about 50 wt % in yet another embodiment.

In preparing the curable resin formulation of the present invention, at least one curing catalyst may optionally be used to facilitate the reaction of the epoxy-functional reaction product with the curing agent. The curing catalyst used in the present invention may be adapted for polymerization, including homopolymerization, of the at least one epoxy-functional resin of the present invention. Alternatively, curing catalyst used in the present invention may be adapted for a reaction between the at least one epoxy-functional resin and the at least one curing agent, if used.

The optional curing catalyst useful in the present invention may include catalysts well known in the art, such as for example, catalyst compounds containing amine, phosphine, heterocyclic nitrogen, ammonium, phosphonium, arsonium, sulfonium moieties, and any combination thereof. Some nonlimiting examples of the catalyst of the present invention may include, for example, ethyltriphenylphosphonium acetate; benzyltrimethylammonium chloride; heterocyclic nitrogen-containing catalysts described in U.S. Pat. No. 4,925,901, incorporated herein by reference; imidazoles; triethylamine; and any combination thereof.

The selection of the curing catalyst useful in the present invention is not limited and commonly used catalysts for epoxy systems can be used. Also, the addition of a catalyst is optional and depends on the system prepared. When the catalyst is used, examples of catalyst include tertiary amines, imidazoles, organophosphines, and acid salts.

Other embodiments of curing catalysts used in the present invention include tertiary amines such as, for example, triethylamine, tripropylamine, tributylamine, 2-methylimidazole, benzyldimethylamine, mixtures thereof and the like.

The concentration of the optional catalyst used in the present invention may range generally from 0 wt % to about 20 wt % in one embodiment, from about 0.01 wt % to about 10 wt % in another embodiment, from about 0.1 wt % to about 5 wt % in still another embodiment, and from about 0.2 wt % to about 2 wt % in yet another embodiment. Above and below the aforementioned ranges, there is no significant effect or there may be some deterioration of the resin properties.

Other optional components that may be useful in the present invention are components normally used in resin formulations known to those skilled in the art. For example, the optional components may comprise compounds that can be added to the composition to enhance application properties (e.g. surface tension modifiers or flow aids), reliability properties (e.g. adhesion promoters) the reaction rate, the selectivity of the reaction, and/or the catalyst lifetime.

An assortment of additives may be added to the compositions of the present invention including for example, other resins such as epoxy resins that are different from the divinylarene dioxide, component (a), diluents, stabilizers, fillers, plasticizers, catalyst de-activators, and the like; and mixtures thereof.

Other additives useful in the formulation of the present invention may include for example, a halogen containing or halogen free flame retardant; a solvent for processability including for example acetone, methyl ethyl ketone, an Dowanol PMA; adhesion promoters such as modified organosilanes (epoxidized, methacryl, amino), acytlacetonates, or sulfur containing molecules; wetting and dispersing aids such as modified organosilanes; a reactive or non-reactive thermoplastic resin such as polyphenylsulfones, polysulfones, polyethersolufones, polyvinylidene fluoride, polyetherimide, polypthalimide, polybenzimidiazole, acrylics, phenoxy, urethane; a mold release agent such as waxes; other functional additives or pre-reacted products to improve polymer properties such as isocyanates, isocyanurates, cyanate esters, allyl containing molecules or other ethylenically unsaturated compounds, and acrylates; and mixtures thereof.

The concentration of the additional additives is generally between 0 wt % to about 90 wt % in one embodiment, between about 0.01 wt % to about 80 wt % in another embodiment, between about 1 wt % to about 65 wt % in still another embodiment, and between about 10 wt % to about 50 wt % in yet another embodiment, based on the weight of the total composition. Above and below the aforementioned ranges, there is no significant effect or there may be some deterioration of the resin properties.

Once the compounds of the curable composition are mixed together, the curing of the curable composition may be carried out at a predetermined temperature and for a predetermined period of time sufficient to cure the composition and the curing may be dependent on the hardeners used in the formulation. For example, the temperature of curing the formulation may be generally from about 10° C. to about 200° C. in one embodiment; from about 100° C. to about 190° C. in another embodiment; from about 125° C. to about 175° C. in still another embodiment; and the curing time may be chosen generally between about 1 minute to about 4 hours in one embodiment, between about 5 minutes to about 2 hours in another embodiment, and between about 10 minutes to about 1.5 hours in still another embodiment. Below a period of time of about 1 minute, the time may be too short to ensure sufficient reaction under conventional processing conditions; and above about 4 hours, the time may be too long to be practical or economical.

The thermoset product (i.e. the cross-linked product made from the curable composition) of the present invention range in form from soft elastomers to rigid glasses depending on the epoxy-functional resin and curing agent used. The thermoset products of the present invention are useful in applications such as coatings, moldings, castings, composites, adhesives, sealants, and elastomers.

EXAMPLES

The following examples and comparative examples further illustrate the present invention in detail but are not to be construed to limit the scope thereof.

Various terms and designations used in the following examples are explained herein below:

"DVBDO" stands for divinylbenzene dioxide. The DVBDO used in the examples has an epoxide equivalent weight of 81 g/eq. WO2010077483 describes one of range of methods of preparing DVBDO.

DER 332 and DER 664UE are epoxy resins available from The Dow Chemical Company.

Diethylenetriamine (DETA) is available from The Dow Chemical Company.

2-Methoxyethylamine (MXEA), n-butylamine (nBA), isopropyl amine (IPA), N,N-dimethylethylenediamine (11DMEDA), N,N'-dimethylethylenediamine (12DMEDA), and piperazine (PIP) are available from Aldrich Chemical Co.

Jeffamine M-600 polyether amine is available from Huntsman Advanced Materials.

The following amines were prepared by amination of the corresponding glycol ether and are indicated by the corresponding acronym as follows: 1-methoxy-2-aminopropane (PM-A), 1-(2-methoxy-1-methylethoxy)-2-amino-propane (DPM-A), 1-propoxy-2-aminopropane (PnP-A), 1-butoxy-2-aminopropane (PnB-A), 2-butoxy-1-aminoethane (EB-A), 2-(2-methoxyethoxy)-1-aminoethane (DM-A). (Note on the latter amine acronyms: the first letter represents the base glycol, with E=ethylene glycol, D=diethylene glycol, P=propylene glycol, and DP=dipropylene glycol; the second letter(s) represent the alcohol initiator, with M=methyl, B or nB=n-butyl, nP=n-propyl. In these terms MXEA=EM-A.)

The following standard analytical equipments and methods are used in the Examples:

Differential Scanning Calorimetry

Differential scanning calorimetry (DSC) experiments were performed on a TA Instruments Q-1000 Calorimeter. One scan from an equilibrated temperature of 35° C. to 160° C. at 10° C./minute under nitrogen ($N_2$) with an interim cool-down at 10° C./minute was performed for each sample in an open aluminum pan. Reported glass transition temperature (Tg) values were taken as the half-height of the heat capacity curve.

Triple Detector Gel Permeation Chromatography

Triple detector gel permeation chromatography (GPC-TD) was done as previously described using refractive index, viscosity, and light scattering detectors. Calibration for molecular weight analysis was done using DER 664UE epoxy resin.

Rheology

Rheology was done on a TA Instruments ARES Rheometer using a 40 millimeter (mm) parallel plate fixture operated for the temperature sweeps from 25° C. to 200° C. at 5° C./minute and a frequency of 10 $s^{-1}$ and with isothermal holds at 150° C. or 200° C.

Property estimations were done using the method of Bicerano as described in *Prediction of Polymer Properties*, Dekker, New York, 1993.

Examples 1-14 and Comparative Examples A-E

General Procedure for Preparing an Epoxy-Functional Reaction Product

The reaction used to prepare several epoxy-functional products was conducted as follows:

To a 100 mL round-bottomed flask fitted with a mechanical stirrer, a $N_2$ inlet, a condenser, an addition funnel, and a thermocouple connected to a temperature controller was added the amount of epoxy resin as shown in Table I. The initial temperature was ambient for DVBDO and 30° C. for DER 332. The amine was then added to the addition funnel and the apparatus was purged with $N_2$ for 15 minutes. Then the amine was added dropwise into the flask with stiffing while monitoring the reaction for increasing temperature. After complete amine addition and with continued stirring the mixture was heated by lamps connected to the temperature controller to gradually increase the temperature (by adjusting the temperature set-point) while monitoring for the reaction exotherm (typically at approximately 80° C.). Heating was continued until reaching and holding for approximately 15 minutes at approximately 185° C. The reaction product was poured into a sheet of Al foil, allowed to cool, and bottled.

TABLE I

Raw Materials for the Synthesis of Examples 1-14 and Comparative Examples A-E

| Example | Epoxy | Amine | Target EEW | r | Epoxy (g) | Amine (g) | (AEW) |
|---|---|---|---|---|---|---|---|
| 1 | DVBDO | MXEA | 600 | 1.23 | 35.01 | 13.21 | 37.6 |
| 2 | | (EM-A) | 900 | 1.14 | 21.39 | 8.66 | |
| 3 | | | 1800 | 1.06 | 16.51 | 7.22 | |
| 4 | | | 3200 | 1.01 | 16.02 | 7.11 | |
| 5 | | M-600 | 900 | 1.46 | 10.02 | 24.71 | 29.1 |
| 6 | | DM-A | 900 | 1.15 | 10.03 | 6.32 | 59.6 |
| 7 | | EB-A | 900 | 1.17 | 15.03 | 9.26 | 58.6 |
| 8 | | DPM-A | 900 | 1.20 | 10.02 | 7.59 | 73.6 |
| 9 | | PnB-A | 900 | 1.18 | 15.02 | 10.33 | 65.6 |
| 10 | | PnP-A | 900 | 1.18 | 15.03 | 9.24 | 58.6 |
| 11 | | PM-A | 900 | 1.18 | 12.06 | 5.61 | 44.5 |
| 12 | | 11DMEDA | 900 | 1.16 | 15.01 | 7.08 | 44.1 |
| 13 | | nBA | 900 | 1.12 | 10.02 | 4.05 | 36.6 |
| 14 | | IPA | 900 | 1.14 | 19.06 | 6.12 | 29.6 |
| A | | DETA | 143 | 4.02 | 10.00 | 0.63 | 20.6 |
| B | | 12DMEDA | 900 | 1.16 | 15.03 | 7.03 | 44.1 |
| C | | PIP | 900 | 1.15 | 15.01 | 6.82 | 43.1 |
| D | DER 332 | MXEA | 900 | 1.30 | 35.04 | 5.90 | 37.6 |
| E | | nBA | 900 | 1.24 | 12.54 | 2.14 | 36.6 |
| F | | DMEDA | 900 | 1.28 | 20.02 | 4.00 | 44.1 |

The properties of the compositions of the above examples described in Table I are listed in the following Table II.

TABLE II

Properties of DVBDO-1° Amine Resins

| Example | Epoxy | Amine | Target EEW | Tg (° C.) | $M_n$ | $M_w$ | disp. | EEW (calc) | $\eta^*$ (150° C.) (mPa-s) | $\eta^*$ (200° C.) (mPa-s) | % $\Delta\eta^{*a}$ |
|---|---|---|---|---|---|---|---|---|---|---|---|
| 1 | DVBDO | MXEA | 600 | 29 | 1773 | 4513 | 2.55 | 887 | | 253 | |
| 2 | | (EM-A) | 900 | 32 | 2658 | 5498 | 2.07 | 1329 | 3573 | 446 | 5.7 |
| 3 | | | 1800 | 38 | 2961 | 6985 | 2.36 | 1481 | | 1254 | |

TABLE II-continued

Properties of DVBDO-1° Amine Resins

| Example | Epoxy | Amine | Target EEW | Tg (° C.) | GPC-TD M$_n$ | M$_w$ | disp. | EEW (calc) | η* (150° C.) (mPa-s) | η* (200° C.) (mPa-s) | % Δη*$^a$ |
|---|---|---|---|---|---|---|---|---|---|---|---|
| 4 | | | 3200 | 37 | 3060 | 7257 | 2.37 | 1530 | | 1507 | |
| 5 | | M-600 | 900 | −52 | 1820 | 3004 | 1.65 | 910 | 278 | 18 | 46.1 |
| 6 | | DM-A | 900 | 3 | 1863 | 3766 | 2.02 | 932 | 2050 | | 7.4 |
| 7 | | EB-A | 900 | 6 | 1807 | 3548 | 1.96 | 904 | 1978 | | 8.1 |
| 8 | | DPM-A | 900 | 11 | 1390 | 2436 | 1.75 | 695 | 3711 | | 6.1 |
| 9 | | PnB-A | 900 | 20 | 1532 | 2681 | 1.75 | 766 | 600 | | 8.2 |
| 10 | | PnP-A | 900 | 24 | 1481 | 2635 | 1.78 | 741 | 738 | | 12.4 |
| 11 | | PM-A | 900 | 37 | 1324 | 2508 | 1.89 | 662 | 2109 | | 11.7 |
| 12 | | 11DMEDA | 900 | 44 | 6098 | 6359 | 1.04 | 3049 | 2131 | | 4.2 |
| 13 | | nBA | 900 | 48 | 2344 | 4870 | 2.08 | 1172 | 8240 | 550 | 9.9 |
| 14 | | IPA | 900 | 77 | 2289 | 5465 | 2.39 | 1145 | 87836 | | 7.5 |
| A | | 12DMEDA | 900 | gel | | | | | | | |
| B | | PIP | 900 | gel | | | | | | | |
| C | | DETA | 143 | gel | | | | | | | |
| D | DER 332 | MXEA | 900 | 26 | 3474 | 4436 | 1.28 | 1737 | 9313 | 191 | 31.3 |
| E | | nBA | 900 | 35 | 4083 | 5356 | 1.31 | 2042 | 11128 | 481 | 15.9 |
| F | | DMEDA | 900 | gel | | | | | | | |

NOTES FOR TABLE II:
$^a$At 150° C. for 10 minutes

In the following Examples 15-18, a bis-2° amine was used to prepare epoxy-functional DVBDO-2° amine resins. EEW was determined by derivatizing the epoxides with excess of pyridinium chloride in a pyridine solution. The excess of pyridinium chloride was determined by titrating it with potassium hydroxide using potentiometric end point determination.

Jeffamine SD 231 is a commercial grade of N,N'-bis(2-propyl)polyoxypropylenediamine having a number average molecular weight of about 400 g/mole and Jefflink 754 is a commercial grade of N,N-bis(sec-propylamino)isophorone diamine and were both received from Huntsman Advanced Materials. Methyl-p-toluenesulfonate (MPTS) was purchased from Fluka.

Example 15

DVBDO (20.00 g) and Jefflink 754 (25.88 g) were mixed in a three neck flask equipped with mechanical stirring, condenser and a temperature port. The flask was flushed with nitrogen. The temperature was raised to 150° C. and the reaction mixture was incubated for 6 hours. Reaction mixture was cooled to 25° C. and the product was characterized. The resulting resin had a Tg of 16° C. and EEW of 521. Since the molar ratios were chosen to target an EEW of 900, an EEW of 521 corresponds to 47% conversion of the amine.

Example 16

DVBDO (20.00 g), Jefflink 754 (25.88 g) and MPTS (0.23 g, 0.5 wt. %) were mixed in a three neck flask equipped with mechanical stifling, condenser and a temperature port. The flask was flushed with nitrogen. The temperature was raised to 150° C. and the reaction mixture was incubated for 4 hours. Reaction mixture was cooled to 25° C. and the product was characterized. The resulting resin had a Tg of 55° C., EEW of 934 and 7151 mPa-s viscosity at 150° C. Since the molar ratios were chosen to target an EEW of 900, the resulting EEW of 934 indicates full amine conversion.

Example 17

DVBDO (20.00 g) and Jeffamine SD 231 (30.91 g) were mixed in a three neck flask equipped with mechanical stirring, condenser and a temperature port. The flask was flushed with nitrogen. The temperature was raised to 150° C. and the reaction mixture was incubated for 4 hours. Reaction mixture was cooled to 25° C. and the product was characterized. The resulting resin was a liquid and had a Tg of −36° C. and EEW of 496. The molar ratios were chosen to target an EEW of 900, so the amine conversion was 42%.

Example 18

Example 17 was repeated except 0.5 wt. % MPTS was added to the reaction mixture before incubation. The resultant resin was a sticky solid, had a Tg of −5° C. and EEW of 1107, indicating that the amine conversion was 100% and some branching through the secondary OH groups also occurred.

Example 19 and Comparative Examples G and H

DVBDO-nBA and DER 332-nBA resins are prepared from one equivalent of epoxy resin and 0.5 equivalents of nBA. These resins and DVBDO are fully cured with DETA at balanced stoichiometry to give rigid thermosets having properties shown in Table III, wherein CTE$_r$ is the rubbery coefficient of thermal expansion, E is the tensile modulus, and K$_{IC}$ is the critical stress intensity factor (fracture toughness).

TABLE III

Monomer Amounts and Properties of Thermosets.

| Example | Epoxy | nBA (equiv.) | DETA (equiv.) | T$_g$ (° C.) | CTE$_r$ (ppm/° C.) | E (MPa) | K$_{IC}$ (MPa-m$^{0.5}$) |
|---|---|---|---|---|---|---|---|
| G | DVBDO | 0 | 1.0 | 188 | 182 | 5870 | 0.5 |
| 19 | DVBDO | 0.5 | 0.5 | 133 | 199 | 5290 | 1.0 |
| H | DER 332 | 0.5 | 0.5 | 100 | 218 | 3170 | 1.0 |

The above results illustrate several beneficial attributes of the compositions of the present invention versus the comparative examples including the following:

(1) The epoxy-functional resins of the present invention may be prepared using a variety of 1° monoamines, such as alkyl, ether, and tertiary amino amines or a variety of bis-2° amines excepting those bearing β nitrogen atoms.

(2) The epoxy-functional resins of the present invention are soluble in polar organic solvents and have finite melt viscosity.

(3) The epoxy-functional resins of the present invention exclude those derived from bis-2° amines bearing β nitrogen atoms and polyethyleneamines because these types of amines form gelled (insoluble, infinite melt viscosity) polymers.

(4) The epoxy-functional resins of the present invention have higher $T_g$, lower melt viscosity ($\eta^*$), and lower change in melt viscosity (% $\Delta\eta^*$) than analogs prepared from bisphenol A diglycidyl ether (DER 332). Specifically, the $T_g$ of the DVBDO-MXEA is about 23% greater than that of its DER 332 analog, the $\eta^*$ of the DVBDO-nBA resin is about 26% lower than that of its DER 332 analog, and the % $\Delta\eta^*$ of the DVBDO-nBA resin is about 38% lower than its DER 332 analog.

(5) The thermoset derived from the epoxy-functional resins of the present invention have greater fracture toughness than those prepared from DVBDO alone and have higher Tg, greater E, and lower $CTE_r$ than analogs prepared from prior art resins.

The invention claimed is:

1. A curable epoxy resin composition comprising
   (i) an epoxy-functional resin composition of the reaction product of (a) a stoichiometric excess of at least one divinylarene dioxide; and (b) at least one difunctional amine of: (i) a primary (1°) monoamine, (ii) a bis-secondary (2°) amine lacking β nitrogen atoms, or (iii) mixtures thereof, and
   (ii) at least one curing agent.

2. The curable epoxy resin composition of claim 1, wherein the at least one divinylarene dioxide comprises divinylbenzene dioxide.

3. The curable epoxy resin composition of claim 1, wherein the at least one primary monoamine comprises an organic amine have a structure R—$NH_2$, where R is an organic group bearing a substituent except that which reacts with an epoxide group without a catalyst at temperatures less than 100 ° C.; wherein the R group comprises alkyl, cycloalkyl, alkenyl, aryl, or aralkyl, said R group containing from 1 to about 200 carbon atoms; and wherein the substituents comprise alcohols, ethers, esters, halogens, thioethers, cyano, tertiary amino or amides.

4. The curable epoxy resin composition of claim 1, wherein the at least one bis-secondary amine comprises an organic amine have a structure R—NH—R'—NH—R", where R, R', and R" are an organic group bearing a substituent except that which reacts with an epoxide group without a catalyst at temperatures less than 100 ° C.

5. The curable epoxy resin composition of claim 4, wherein the R, R', and R" group each separately and independently comprises alkyl, cycloalkyl, alkenyl, aryl, or aralkyl, said R, R', and R" group containing from 1 to about 200 carbon atoms; and wherein the R, R', and R" group each separately and independently comprises bear substituents comprising alcohols, ethers, esters, halogens, thioethers, cyano, tertiary amino or amides.

6. The curable epoxy resin composition of claim 1, including a reaction catalyst comprising at least one of a sulfonate ester or a hydrogen donor compound.

7. The curable epoxy resin composition of claim 6, wherein the at least one sulfonate ester comprises an alkylbenzenesulfonate.

8. The curable composition of claim 1, wherein the curing agent comprises a polyamine, a polyphenol, a polymercaptan, an anhydride, or mixtures thereof.

9. The curable composition of claim 1, including at least one curing catalyst; wherein the at least one curing catalyst comprises a tertiary amine, an imidazole, an ammonium salt, a phosphonium salt, a Lewis acid, or mixtures thereof.

10. The curable composition of claim 9, including a filler, a reactive diluent, a flexibilizing agent, a processing aide, a toughening agent, or a mixture thereof.

11. A process for preparing a curable epoxy resin composition comprising admixing (i) an epoxy-functional resin composition of of the reaction product of (a) a stoichiometric excess of at least one divinylarene dioxide; and (b) at least one difunctional amine of: (i) a primary (1°) monoamine, (ii) a bis-secondary (2°) amine lacking β nitrogen atoms, or (iii) mixtures thereof, and (ii) at least one curing agent.

12. A process for preparing a thermoset resin comprising curing the composition of claim 1.

13. A cured thermoset article prepared by the process of claim 12.

* * * * *